United States Patent [19]
Lenahan et al.

[11] Patent Number: 5,685,158
[45] Date of Patent: Nov. 11, 1997

[54] COMPRESSOR ROTOR COOLING SYSTEM FOR A GAS TURBINE

[75] Inventors: Dean Thomas Lenahan; Poul D. Pedersen, both of Cincinnati; Larry Wayne Plemmons, Fairfield; Christopher Charles Glynn, Hamilton; Frederick M. Miller, Cincinnati; Curtis W. Stover, Mason, all of Ohio

[73] Assignee: General Electric Company, Schenectady, N.Y.

[21] Appl. No.: 414,699

[22] Filed: Mar. 31, 1995

[51] Int. Cl.$^6$ ............................................ F02C 1/00
[52] U.S. Cl. ........................ 60/726; 60/39.02; 416/95
[58] Field of Search .............................. 60/39.02, 726, 60/728, 730; 415/115; 416/95, 96 R

[56] References Cited

U.S. PATENT DOCUMENTS

| | | | |
|---|---|---|---|
| 3,546,882 | 12/1970 | Berkey . | |
| 4,291,531 | 9/1981 | Campbell | 60/726 |
| 4,719,747 | 1/1988 | Willkop et al. | 60/726 |
| 4,793,772 | 12/1988 | Zaehring et al. | 416/95 |
| 5,310,319 | 5/1994 | Grant et al. | 416/95 |
| 5,360,318 | 11/1994 | Siga et al. . | |

FOREIGN PATENT DOCUMENTS

| | | |
|---|---|---|
| U-86 05 507 | 4/1987 | Germany . |
| 2 270 118 | 3/1994 | United Kingdom . |

OTHER PUBLICATIONS

"GE Gas Turbine Design Philosophy"—GE Turbine Reference Library, Brandt et al., GE Power Generation. Date Unavailable.

*Primary Examiner*—Charles G. Freay
*Attorney, Agent, or Firm*—Nixon & Vanderhye

[57] ABSTRACT

In a gas turbine including a compressor having a bore and a rotor comprised of multiple stages extending between a first stage at a forward end of the compressor and a last stage at an aft end of the compressor, each stage including a rotor disk having a peripheral rim and multiple blades secured to the peripheral rim, a combustion system comprising a plurality of combustors utilizing discharge air from the compressor for combustion, and multiple turbine stages driven by combustion gases from the combustion system, the improvement comprising means for supplying cooling air at least to a peripheral rim of the last stage of the compressor.

37 Claims, 5 Drawing Sheets

COMPRESSOR ROTOR COOLING SYSTEM FOR A GAS TURBINE

TECHNICAL FIELD

This invention relates generally to a new land based gas turbine in simple or combined cycle configuration, which permits a user to choose air or steam cooling of certain hot gas turbine parts with minimal change in components, and which also incorporates design changes enabling certain turbine components to be used without change in both 50 and 60 Hz turbines. The invention disclosed in this application relates specifically to cooling the last stages of the axial flow compressor of the gas turbine to permit an increase in compressor discharge pressure, thereby increasing the output of the gas turbine.

BACKGROUND

Current large industrial (land based) gas turbine requirements include a compressor rotor with a creep rupture life of at least 240,000 hours at full power conditions. The compressor discharge air temperature is a major factor in determining the creep rupture life, since the rim of the last stage of the compressor rotor (the compressor "rotor" comprises the plurality of bladed disks or wheels of the various compressor stages held together by a plurality of circumferentially spaced, axially extending bolts) is completely exposed to the compressor exit flow path air temperature. Thus, the compressor air exit temperature establishes the required rotor material to achieve the required creep rupture life. In the past, the compressor exit temperature has been limited to about 750° F., in an effort to keep the rim of the last compressor rotor disk at or below that temperature so as to enable the use of inexpensive materials such as CrMoV alloys.

While more expensive materials such as INCO-706 could be used for the compressor rotor disks, the material cost is prohibitive because of the massive size of the machine.

On any new gas turbine engine for power generation applications where operating costs are critical, there is also an established need to reduce the dollar cost per kilowatt. To do this, it is necessary to increase the gas turbine output without increasing the engine size. The best way to accomplish this goal is to increase the compressor pressure ratio and thus, the compressor discharge pressure (CDP). The increase in CDP in accordance with the exemplary embodiment of this invention doubles the compressor flow and thus doubles the engine output, but without requiring an increase in the engine/frame size. The downside of this methodology arises in that the compressor discharge temperature also increases, in this case by about 150° F. to about 900° F.

DISCLOSURE OF THE INVENTION

In accordance with this invention, it has been determined that, in order to use the less costly CrMoV material in an advanced industrial gas turbine compressor application, it is necessary that the disk rim metal of the last compressor stage not be allowed to exceed 825° F., and that the compressor rotor bore not be allowed to exceed 700° F. Given the increase in compressor discharge temperature to about 900° F. attendant the increase in CDP, it is a principal objective of this invention to cool the disk rim of the last compressor stage from the increased compressor flow path temperature of about 900° F. down to about 825° F., and to maintain the compressor bore temperature at about 700° F. The first step towards accomplishing this goal is to supply a well defined quantity of cool air to the region of the last stage disk rim at a pressure that is higher than the compressor main steam static pressure. The primary approach in accordance with this invention is to extract compressor discharge air from the conventionally arranged combustor casing (i.e., downstream of the compressor diffuser) as a source of cooling air for the last stages of the compressor. The cooling air extracted from the combustor casing is first delivered to a heat exchanger where the air is cooled. It is then delivered back to the compressor rotor via a flow control valve, an exterior manifold system, and multiple, circumferentially arranged radial feed pipes. The cooling air flows through the radial pipes and is delivered to an internal 360° chamber, above and forward of the annular CDP seal.

After the cooling air enters the chamber, it flows rearwardly (i.e., counter to the direction of normal compressor air flow) to the compressor rotor aft cavity. The flow then is split into three component parts. A first part comprises compressor purge flow that dumps into the compressor flow path behind the last stage of the compressor. This component of the cooling air is used to prevent hot compressor flow from being ingested into the compressor rotor cavity. A second component comprises compressor rotor rim cooling air. This second component flows through axial passages in the compressor rotor aft cooling plate and axial passages formed between the blade shanks and the disk slot bottoms to cool the rims of the disks in the last five stages of the compressor. The third and final cooling air component bypasses a discourager seal (an integral part of the CDP seal) segregating the compressor aft rotor cavity from the CDP seal/rotor temperature control air supply cavity. Some of this third component of the cooling air is introduced via radial pipes to the compressor rotor bore for cooling the bore and the rotor disks, while a remaining part of the third component escapes in a predetermined manner past the CDP seal and eventually mixes with the combustion gases in the gas turbine.

One of the unique features of this invention lies in the design of the CDP seal which directs the flow of cooling air upon introduction to the compressor. The CDP seal incorporates a rearwardly extending discourager seal (mentioned above) which defines, in part, an upper compressor rotor cavity and a lower compressor rotor cavity. The upper cavity flow is subsequently divided into the first and second flow components mentioned above, while the lower cavity flow supplies the third component of the cooling air flow to the CDP seal and compressor rotor bore. The discourager seal also prevents any recirculation of flow from the lower cavity back into the upper cavity. As a result, the flow in the lower cavity will be warmer than flow in the upper cavity. This approach allows the compressor disks to be controlled to a temperature of about 700° F. at the bore and about 800° F. at the rim.

Another feature of the CDP seal is that it allows both the rotor and stator components to be bathed in the same cooled air. Thus, the steady state thermal growth of both rotor and stator components will be comparable and lower in value when compared to a seal that has compressor discharge air (900° F.) flowing through it. The mass of the rotor and stator components as well as the heat transfer can be matched to yield a comparable thermal response rate. This results in a CDP seal that has tight clearances at all operating conditions.

Another feature of the invention is the procedure used to cool the compressor disk rims as part of the second cooling component. The cooled CDP air that is supplied to the upper compressor aft rotor cavity at 670° F. is brought on board the rotor through axial holes in the aft cooling plate. As the cooling air is brought on board the rotor, the air impinges on the back side of the last disk web between the inertia ring and the rim. This helps cool the compressor disk web as well as the rim. Since there is a significant amount of cooling heat transfer surface area, it is fairly easy to cool the last disk rim down to 825° F. where the CrMoV disk material can survive for more than 240,000 hours. Once the cool air is on board the rotor, where the relative air temperature is 750° F., it is allowed to flow axially through slots between the disk slot bottoms (or rabbets) and the blade shanks in the last five disks.

Another feature of this invention is the compressor rotor temperature control system. Temperature control is accomplished with the rotor temperature control air which is brought on board the compressor rotor from the lower aft cavity, ahead of the CDP seal, and introduced into the compressor bore as part of the third component of the cooling air. The total compressor bore flow is divided up into predetermined flow elements that are directed radially outwardly between the last five compressor disks. The purpose of the rotor bore flow is to create a well defined flow and heat transfer environment around the individual disks of the last five stages of the compressor. The heat transfer should be high enough to increase the thermal response rate to the point where it matches the stator structure thermal response. By matching the thermal response rate of the rotor to the stator structure, a thermal growth environment is produced where the rotor and stator radial thermal growths are matched during any transient or steady state condition. As the compressor rotor cooling air passes radially outwardly through the inertia ring, it is metered into the axial slots at the ID of the disk rabbets. The various discharge pressures that the cool air wants to dump to in the compressor flow path show that the cooling air is always flowing to a well defined sink pressure which is controlled by the compressor aerodynamics. This will insure that the compressor rotor cooling design has consistent flow parameters during the detailed design execution at both design and off-design conditions.

Several additional features have also been incorporated into the invention, and are discussed in further detail herein.

In its broader aspects, the invention comprises a land-based gas turbine including a compressor having a bore and a rotor comprised of multiple stages extending between a first stage at a forward end of the compressor and a last stage at an aft end of the compressor, each stage including a rotor disk having a peripheral rim and multiple blades secured to the peripheral rim, a combustion system comprising a plurality of combustors utilizing discharge air from the axial flow compressor for combustion, and multiple turbine stages driven by combustion gases from the combustion system, the improvement comprising means for supplying cooling air at least to a peripheral rim of the last stage of the compressor.

In another aspect, the present invention comprises a land-based gas turbine comprising a compressor including a rotor and a plurality of bladed disks and associated rims extending from a forward end to an aft end of the compressor; a plurality of combustors, and a casing surrounding said combustors arranged to direct air from the compressor to the combustors; and a turbine including multiple stages driven by combustion gases from the plurality of combustors, and wherein cooling air is utilized to cool the compressor rotor, the improvement comprising at least one extraction port in said casing and associated piping for supplying compressor discharge air to at least some of the plurality of bladed disks and associated rims at the aft end of the compressor.

In still another aspect, the invention provides in a land-based gas turbine comprising a compressor including a rotor and a plurality of bladed disks and associated rims extending from a forward end to an aft end of the compressor; a plurality of combustors surrounded by a casing arranged to receive combustion air from the compressor; and a turbine including multiple stages driven by combustion gases from the plurality of combustors and wherein cooling air is utilized to cool the compressor rotor, a method of maintaining at least the last of the disks and its associated rim at a predetermined temperature comprising the steps of:

a) extracting cooling air from the casing;

b) introducing the cooling air into the compressor in a direction counter to a flow direction of the combustion air; and e) cooling the last disk and its associated rim to a predetermined temperature.

The principal advantages of this invention can be summarized as follows:

1. Inexpensive CrMoV material can be used for the compressor disks and related hardware (e.g., spacer pieces) despite an increase of about 150° F. in compressor discharge air temperature. This results in a significant cost reduction for each gas turbine engine.

2. The CDP seal clearance can be maintained at a tight level by bathing both the compressor rotor and stator components in the same temperature air. The air that bathes the CDP seal is also cooler by about 150° F. which will result in less thermal growth and, thus, tighter clearances. The CDP seal is set up so that the thermal response rate of the rotor and stator will be matched by easily adjusting the mass of the static structure during the detail design phase. The end result is a CDP seal with less leakage and significantly lower deterioration.

3. The tip clearance control of the compressor blades and cantilevered vanes is greatly improved with a well defined compressor rotor cooling system. The rotor thermal response rate of the rotor will be faster, and will thus come much closer to matching the thermal response of the compressor vane support structure.

Other objects and advantages will become apparent from the detailed description which follows.

BEST MODE FOR CARRYING OUT THE INVENTION

Figure 1:
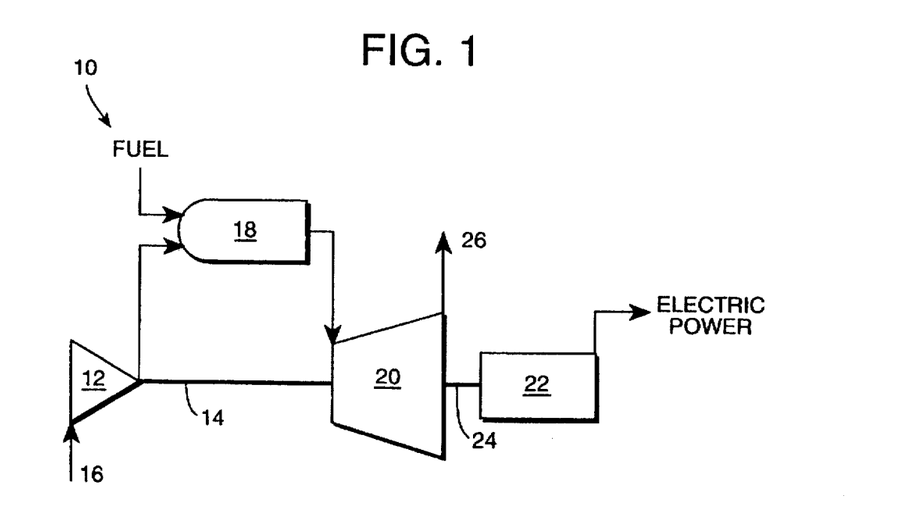
FIG. 1 is a schematic diagram of a simple cycle, single shaft, heavy duty gas turbine.

FIG. 1 is a schematic diagram for a simple-cycle, single-shaft heavy duty gas turbine 10. The gas turbine may be considered as comprising a multi-stage axial flow compressor 12 having a rotor shaft 14. Air enters the inlet of the compressor at 16 is compressed by the axial flow compressor 12 and then is discharged to a combustor 18 where fuel such as natural gas is burned to provide high energy combustion gases which drive a turbine 20. In the turbine 20, the energy of the hot gases is converted into work, some of which is used to drive compressor 12 through shaft 14, with the remainder available for useful work to drive a load such as a generator 22 by means of rotor shaft 24 (an extension of the shaft 14) for producing electricity. A typical simple-cycle gas turbine will convert 30 to 35% of the fuel input into shaft output. All but one to two percent of the remainder is in the form of is exhaust heat which exits turbine 20 at 26.

Figure 2:
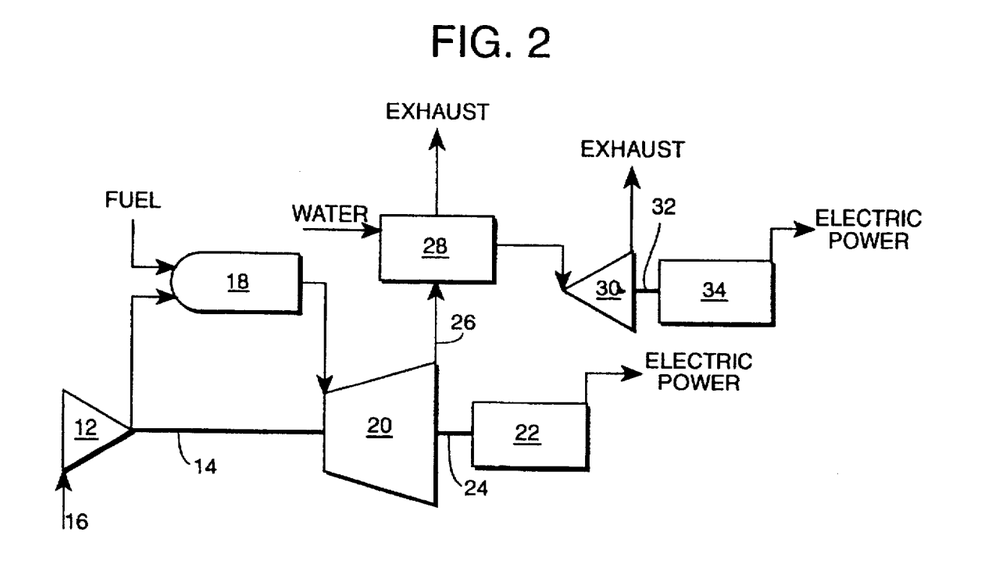
FIG. 2 is a schematic diagram of a combined cycle gas turbine/steam turbine in its simplest form.

FIG. 2 represents the combined cycle in its simplest form in which the energy in the exhaust gases exiting turbine 20 at 26 is converted into additional useful work. The exhaust gases enter a heat recovery steam generator (HRSG) 28 in which water is converted to steam in the manner of a boiler. The steam thus produced drives a steam turbine 30 in which additional work is extracted to drive through shaft 32 an additional load such as a second generator 34 which, in turn, produces additional electric power. In some configurations, turbines 20 and 30 drive a common generator. Combined cycles producing only electrical power are in the 50% to 60% thermal efficiency range using the more advanced gas turbines.

Figure 3:
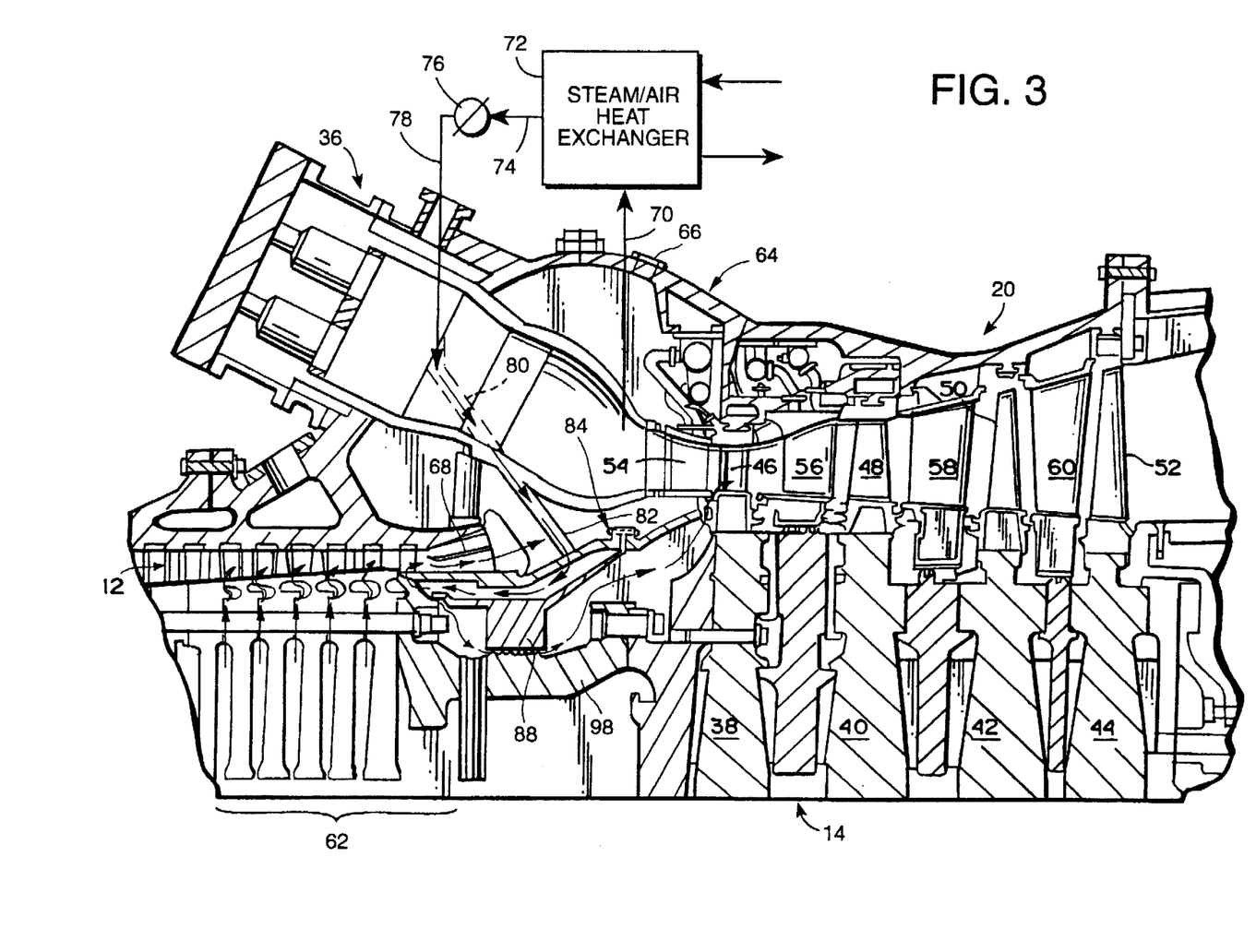
FIG. 3 is a partial cross section of a portion of the gas turbine and axial flow compressor in accordance with this invention.

FIG. 3 illustrates in greater detail the interface between the axial flow compressor 12 and turbine 20 which is the focus of this invention. Air from the compressor 12 is discharged to the several otherwise conventional combustors 36 (one shown) located circumferentially about the rotor 14 in the usual fashion. The gas turbine 10 in accordance with the invention is shown to include the axial flow compressor 12, the final five stages at the aft end of which are shown generally at 62.

The combustion system for the gas turbine is a typical reverse-flow multiple combustor system utilizing the compressor discharge air which is circulated to the rear of the combustor and then forward through the combustion liner and associated combustion zone. The combustion system per se is known and need not be described in any further detail. Following combustion, the resultant gases are used to drive the turbine 20 which includes in the instant example, four successive stages, represented by four wheels 38, 40, 42 and 44 which are an integral part of the rotor 14. Each wheel includes buckets represented respectively, by blades 46, 48, 50 and 52 which are arranged alternately between fixed stators represented by vanes 54, 56, 58 and 60.

In an area surrounding the multiple combustors, defined in part by the fixed turbine casing 64 which surrounds the combustors, a port 66 is provided for extracting compressor discharge air, downstream of the compressor diffuser 68 and "upstream" of the combustors. In other words, air is extracted via port 66 before the compressor discharge air, in its reverse flow path (right to left as shown), reaches the rearward end of combustor 36 where it is redirected in a forward direction within the combustion liner (left to right as shown). To supply adequate amounts of cooling air, two or more extraction ports 66 may be provided in circumferentially spaced relationship about the turbine combustion casing 64. A manifold system, represented schematically at 70 is utilized to deliver the extracted air to a steam/air heat exchanger 72. The compressor discharge air that has exited the compressor diffuser 68 is at a pressure level of about 348 psia and can be easily extracted off the combustor casing 64. This pressure is about 22 psi higher than the compressor exit static pressure of about 326 psia behind the last stage compressor rotor at the flowpath ID. This 22 psi differential is the driving force by which CDP air can be extracted from the combustor case 64, delivered to the heat exchanger 72 where the air is cooled, and then delivered back to the gas turbine compressor rotor. In the preferred arrangement, between 1.0 and 2.0%Wc (Wc is defined as the total compressor air flow) is extracted off the combustor casing 64 at the port(s) 66.

The heat exchanger 72 cools the compressor discharge air from the compressor discharge level of about 900° F. down to about 600° F. To effect the desired cooling, steam is introduced into the heat exchanger at about 600° F. The steam is heated during the heat exchange to about 800° F. and delivered back to its source. In combined cycle arrangements where the gas turbine exhaust is utilized to provide steam for a steam turbine as shown in FIG. 2, the cooling steam is conveniently supplied from the heat recovery steam generator, and the heated steam from the heat exchanger 72 is returned to the bottoming cycle steam turbine where more work is extracted from the newly heated steam flow.

The now cooled CDP air (at about 600° F.) is transferred via pipe 74 to a flow control valve 76 which determines the quantity of cooling air to be returned to the compressor 12.

A manifold system exterior to the turbine casing 64, represented schematically at 78, delivers the cooled air back to the compressor 12 via multiple (preferably, twelve) insulated pipes, one of which is shown at 80. These pipes, each preferably 1.5 to 2 inches in diameter, are located within radial struts (one shown at 82) which connect the combustor casing 64 to the inner first stage turbine nozzle support structure, generally indicated at 84. The insulation may comprise a 60 mil dead air cavity between the strut and the pipe. If needed, a radiation shield (not shown) can be added in an effort to further reduce the heat pickup of the cooling air in the pipes 80.

Figure 4:
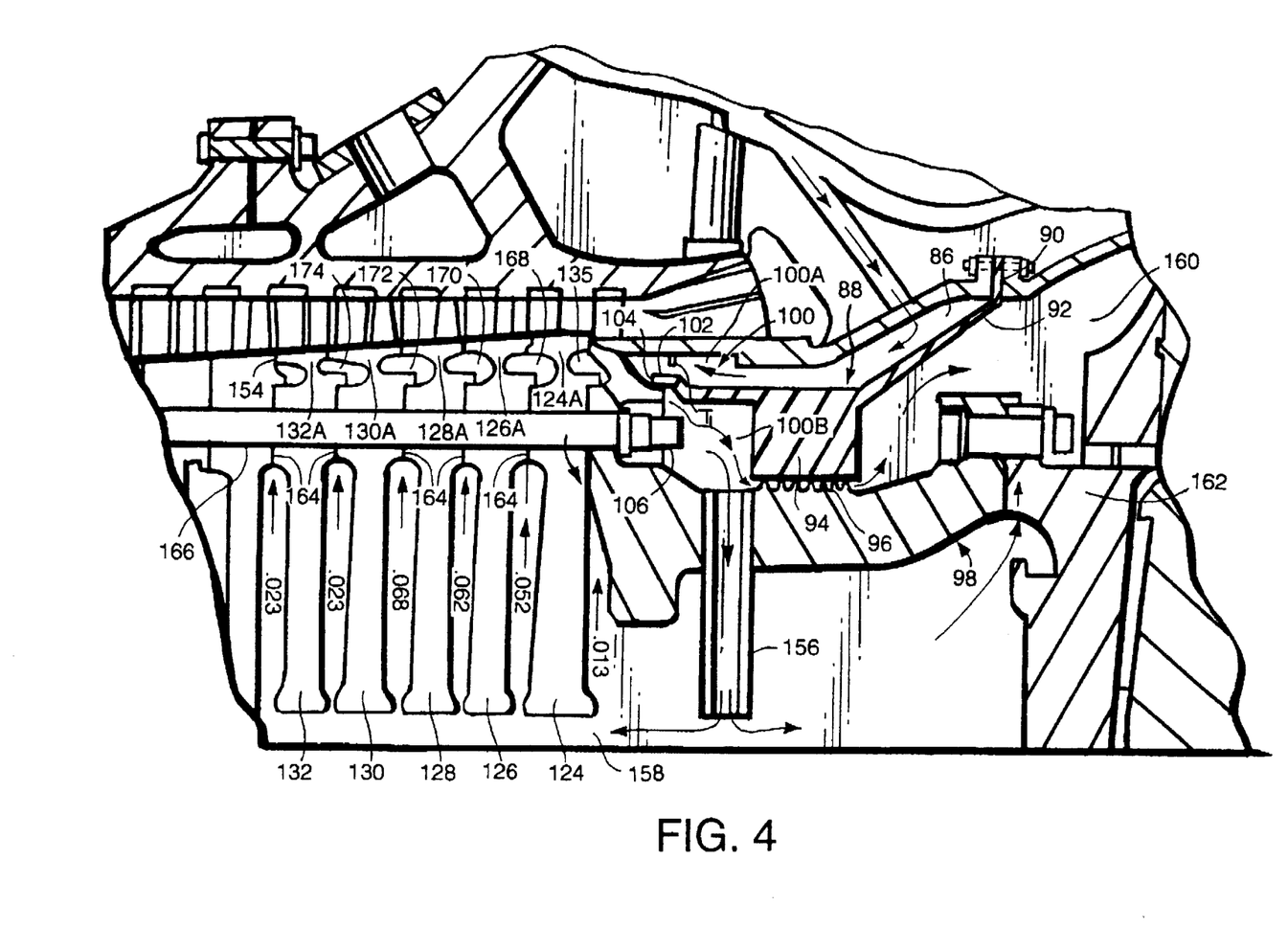
FIG. 4 is an enlarged cross section of the aft stages of the axial flow compressor in accordance with this invention.

With reference now to FIG. 4, the cooling air is delivered via the pipes 80 to a 360° chamber 86 above and slightly forward of a CrMoV compressor discharge seal (the CDP seal) 88. This seal is an annular, stationary structure extending between a turbine casing connection interface at 90, axially forwardly via a relatively thin web 92 to the main body 94 of the seal which lies radially adjacent sealing teeth 96 on an aft cooling plate 98 of the rotor assembly. The CDP seal 88 defines, in part, the annular cooling air chamber 86, and directs the cooling air to a compressor rotor aft cavity 100 where the cooling flow is split into three parts as described further below. The main body 94 of the seal 88 is also formed with a discourager seal portion 102 which extends away from the main body 94 toward the compressor 16. The discourager seal portion 102 engages an annular horizontal shelf 104 of the aft cooling plate 98, thus dividing the aft cavity 100 into an upper cavity 100A and a lower cavity 100B.

It will be appreciated that the total cooling flow to the compressor will depend on the flow requirements for the CDP seal 88 since a portion of the flow will exit through the CDP seal as explained further below. This flow can change as the seal clearance vis-a-vis teeth 96 deteriorates. Thus, the total system must be capable of handling the maximum flow of 2%Wc at the 22 psi ΔP. The upper limit design point thus becomes a cooling supply system that must deliver the 2%Wc cooling air to the compressor rotor with the valve 76 wide open at a ΔP of 22 psi. The valve 76 will then be used to restrict the flow to an amount below 2%Wc, depending on the flow requirements of the CDP seal. The primary objective of the flow control valve 76, then, is to insure that a sufficient cool air supply is maintained in the compressor aft cavity 100 such that no hot compressor flowpath air is ingested into the compressor aft rotor cavity 100 to heat up the cooling air being supplied to the compressor rotor. To prevent this, it is imperative that the temperature of the upper compressor aft rotor cavity 100 be monitored by means of a thermocouple. The temperature sensing junction of the thermocouple is located in the upper cavity 100A. For reliability purposes, 2 thermocouples should be installed in the cavity (one shown at T1). As the CDP seal deteriorates, the leakage flow will increase from about 0.419%Wc to about 1.2%Wc. The effective seal clearance will have opened up from about 20 mils to about 75 mils which is considered a deteriorated seal for a 40 inch diameter seal. As the seal clearance deteriorates, the compressor aft rotor cavity thermocouple will sense an increase in temperature as a slight amount of compressor exhaust air is ingested into the aft cavity 100. When this increase is observed by means of an engine safety monitoring system, the flow control valve opens up and delivers more cooling air until the thermocouple reading is reduced back down to about 670° F.

As described briefly above, the cooling air supplied to the compressor rotor aft cavity is then divided into three discrete flow components, each of which is described in detail below.

The First Cooling Component

Figure 5:
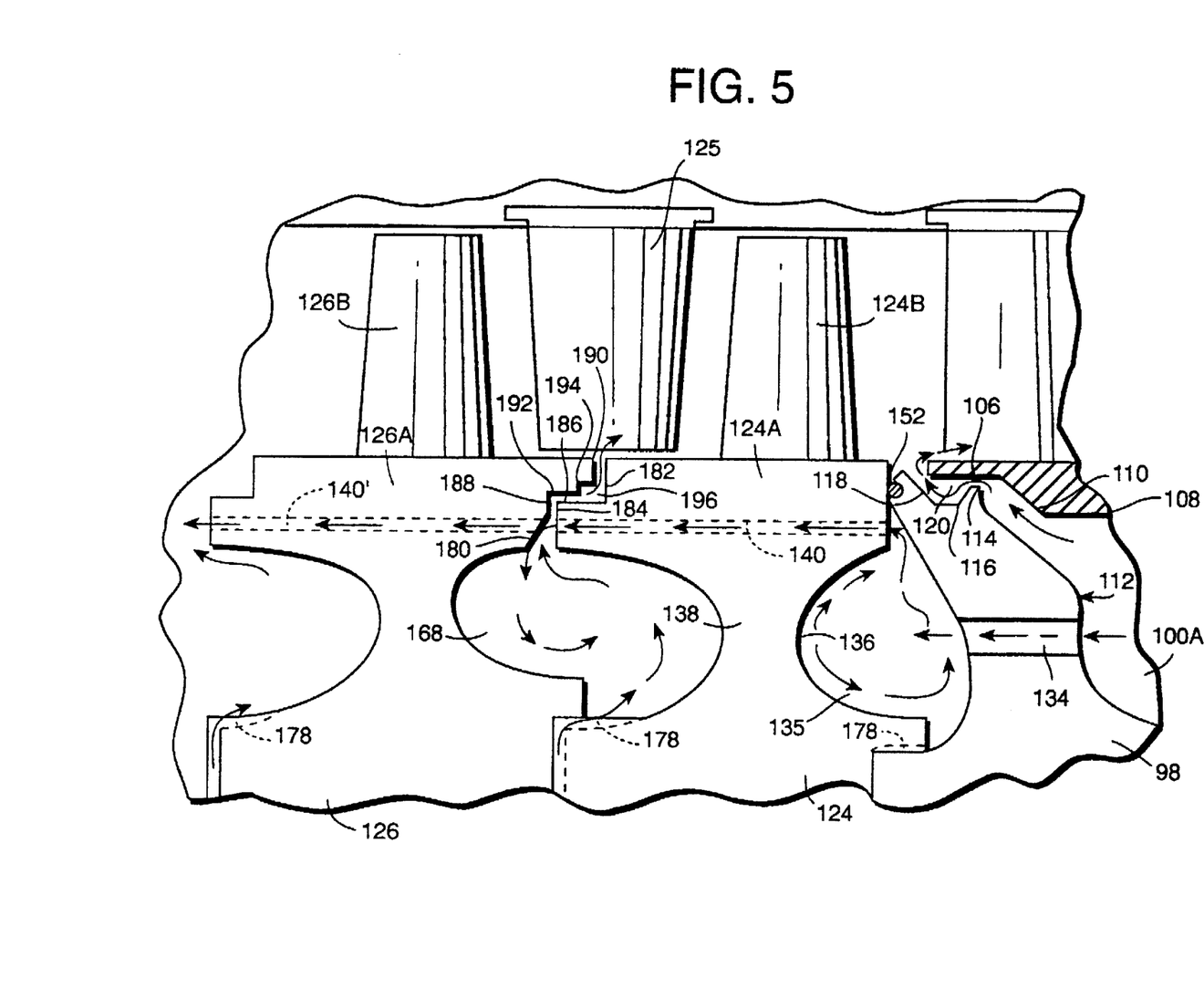
FIG. 5 is an enlarged detail from FIG. 4.

The first component of the total cooling air (e.g., about 1.225%Wc) returned via pipes 80, chamber 86, and compressor rotor aft cavity 100 dumps into the compressor flow path behind the last rotor. More specifically, about 0.195%Wc is returned to the compressor flowpath from the upper cavity 100A in the manner described below. With reference to FIG. 5, a flowpath for this first component is defined by radially offset surfaces 106 and 108 of the stator structure, connected by a radially inclined surface 110. At the same time, the aft cooling plate 98 is formed with an inclined tip portion 112 which is provided with a discourager seal tooth 114 extending radially towards surface 106 adjacent bevelled surface 110. Downstream (in the direction of coolant flow) of the discourager seal 114, the profile of tip portion 112 includes a reduced diameter axial surface 116 and a radially outwardly inclined surface 118 which terminates just behind the edge of surface 106. This arrangement creates an annular buffer cavity 120 forward of the discourager seal 114.

The discourager seal tooth 114 and the buffer cavity 120 reduce the potential of hot compressor discharge air contaminating the compressor disk rim cooling air (discussed below). The buffer cavity 120 also allows circumferential flow which in turn reduces the circumferential stator pressure gradient behind the last stage rotor blades B. As a result, the discourager seal tooth 114 is more effective. With only a small pressure drop produced by the minimal flow of 0.195%Wc across the seal tooth 114, the potential for compressor flow (left to right in FIG. 5) ingestion into the rotor rim cooling air (the second cooling component) in the upper cavity 100A is greatly reduced.

The Second Cooling Component

Figure 6:
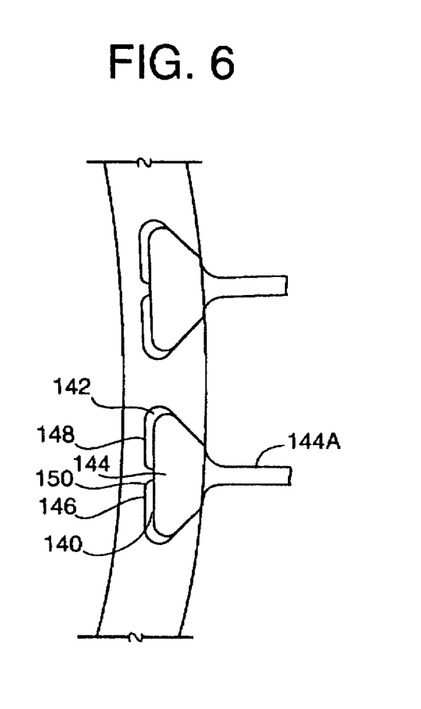
FIG. 6 is a partial axial section of a compressor rotor disk in accordance with the invention.
Figure 7:
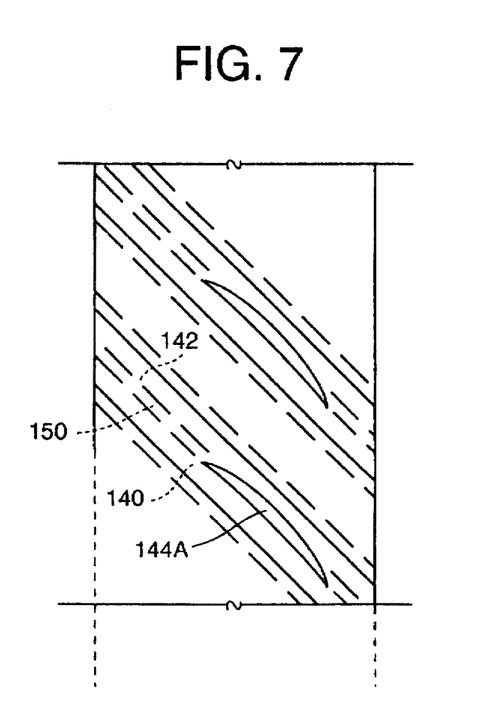
FIG. 7 is a radial plan view of the rotor disk shown in FIG. 6.

The second component of the cooling air serves to cool the compressor disk rims of the last five stages of the axial flow compressor 16 (see FIG. 4). For convenience, the disks themselves are designated 124, 126, 128, 130 and 132 and the radially outer disk rims are designated by the same numbers but with the suffix "A" added. Compressor blades are designated with the same numbers, but with the suffix "B" added. As best seen in FIG. 5, cooling air from the upper cavity 100A (at about 688° F.) is brought on board the compressor rotor by means of axial holes (one shown at 134) in the compressor aft cooling plate 98. About 0.35%Wc flows through the holes 134, and into an annular disk shank cavity 135 where it impinges on the back side 136 of the web 138 radially between rim 124A and disk 124 of the last stage. This helps cool the compressor disk web 138 as well as the rim 124A. Once the cooling air is on board the compressor rotor via holes or passageways 134, where the relative air temperature is about 750° F., it swirls about the cavity 135 and is then allowed to flow axially toward the forward end of the compressor through 30–40 mil high axial slots 140, 142 (see also FIGS. 6 and 7) formed by radial gaps between the bottom surfaces of the blade shanks 144 and the bottom surfaces 146, 148 of the disk dovetail slots (or rabbets) which receive the blade shanks 144 and associated blades 144A in an otherwise conventional fashion. Radial positioners 150 separate the passages 140, 142 (also referred to as slot bottom gap passages), running the entire length of the dovetail slots (arranged 45° from axial as apparent from FIG. 7) in the rim portion 124A of the disk 124. It will be appreciated that each of the disk rims 124A–132A are provided with similar passageways for each and every one of the blades in the respective disks of the last five stages of the compressor.

Cooling air passing through 140, 142 continues through similar, axial passages in each of the disk rims 126A, 128A, 130A and 132A. The passages are not axially aligned, however. In other words, passage 140' is circumferentially offset by a few degrees from passage 140. The cooling air, nevertheless, flows about the annular gap between the rims and into the axial passages of the adjacent rim (labelled 140' in rim 126A). The rim cooling air after passing through the slots in disk rim 132A, returns to the compressor flow through radial gap at 154 (FIG. 4). However, there is also an intermixing of the second and third components of the cooling air as described further below. Further, some of the air leaks out between disk rims 126A and 124A, between 128A and 126A, between 130A and 128A, as well as between 132A and 130A.

Given about a 0.35%Wc flow into the cavity 135, approximately 0.016%Wc escapes through a wire seal 152 at the radial outer edge of the inclined tip 112 of plate 98, behind the last compressor disk 124. The wire seal 152 is designed to reduce the potential for compressor flow path air contaminating the disk rim cooling air in the cavity 135. The system is designed such that if the seal wire 152 is inadvertently left out or becomes dislodged for some unknown reason, the leakage flow would only go up slightly and the flow through the last disk slot bottom passages 140, 142 would only go down slightly. Thus, the reliability of the system is not contingent on the success of the seal wire 152. The seal wire is simply installed to reduce the cooling air leakage into the compressor flowpath which then allows the total flow to the rotor to be minimized.

The Third Cooling Component

The third component of the cooling air comprises the CDP leakage/rotor temperature control system. This third and final component (about 0.685%Wc) bypasses the discourager seal 102 and flows into the lower cavity 100B. Thus, the discourager seal 102 allows the flow in the compressor aft rotor upper cavity 100A to be segregated from the flow in the lower cavity 100B that supplies flow to the CDP seal 88 and to the compressor bore. The discourager seal 102 also prevents any recirculation of flow from the lower cavity 100B back into the upper cavity 100A. Thus, the flow in the lower cavity 100B is allowed to warm up another 20°–30° F. above the flow in the upper cavity 100A since the cavity flow is reduced and rotor drag/windage temperature increase will be larger before the air is brought on board the rotor and sent to the rotor bore. This approach permits the compressor disks to be controlled to the desired 700° F. at the bore and 800° F. at the disk rims. Without this feature, the compressor disk temperature would be 20°–30° F. colder which would make it more difficult to obtain tight blade clearances.

It should also be noted that the CDP seal 88 permits both the rotor and stator components to be bathed in the same cooled air. Thus, the steady state thermal growth of both rotor and stator components will be comparable and lower in value when compared to a seal that has compressor discharge air (900° F.) flowing through it. The mass of the rotor and stator components as well as the heat transfer can be matched to yield a comparable thermal response rate. This results in a seal that provides tight clearances at all operating conditions. This is a critical feature since the objective clearance for a 42 inch diameter CDP seal, for example, at the interface with teeth 96 is about 21 mils.

About 0.266%Wc flows from the lower cavity 100B through a plurality of circumferentially spaced, radially arranged pipes (one shown at 156) and into the compressor rotor bore 158. The remaining 0.419%Wc bypasses the main body 94 of the seal 88, across seal teeth 96, and flows back toward the turbine via cavity 160 where it mixes with combustion gases from the combustor. In addition, about 0.025%Wc from the rotor bore 158 escapes to the cavity 160 at the interface of plate 98 and the turbine end plate or cap 162.

The total bore flow is divided up into flow elements (percent Wc noted in FIG. 4) that are directed up (i.e., radially outwardly) between the last five compressor disks 124, 126, 128, 130 and 132, as well as between the disk 124 and plate 98. The flow between the disks is then directed through radial slots 164 between the circumferentially spaced bolt holes 166 in the inertia ring portions of the disks. The purpose of the rotor bore radial flow is to create a well defined flow and heat transfer environment around the compressor disks. The heat transfer should be high enough to increase the thermal response rate to the point where it matches the stator structure thermal response. As indicated earlier, by matching the thermal response rate of the rotor to the stator structure, a thermal growth environment is established where the thermal growths are matched during any transient or steady state condition. This then reduces the potential for a blade tip rub while allowing the engine to be run at tighter blade tip clearances. Tighter blade tip clearances produce a higher compressor efficiency and better transient stall margin.

From the slots 164, the cooling air passes radially outwardly into cooling cavities 168, 170, 172, 174 and 176 via axial slots 178 (three shown in FIG. 5) where the adjacent disks overlap. Air in the cavities 168, 170, 172, 174 and 176 is metered into the flow control slots 140, 142 of rim 124A (and corresponding slots in like passages in the disk rims 126A, 128A, 130A and 132A) at the ID of the respective disk rabbets. The cooling air is always flowing to a well defined sink pressure (the compressor flow pressure) which is controlled by the compressor aerodynamics. This will insure that the compressor rotor cooling design has consistent flow parameters during the detailed design execution at both design and off-design conditions.

Within the cavities 168, 170, 172, 174 and 176, the bore cooling air swirls and mixes with rim cooling air from the axial passages 140, 142. In this regard, a 45° angled surfaces 180 on the forward faces of the disk rims 126A, 128A, 130A and 132A, at the entrance to the disk slot bottoms, have been incorporated as a means of deflecting the jets emanating from adjacent disk slot bottoms. The 45° angle will deflect the jets radially inward into the cavities 168, 170, 172 and 174 without disturbing the angular momentum of the flow. This will increase the swirl factor in the cavities to a level significantly higher than rotor speed. The disk temperature control air being supplied into the same cavities via passages 178 can also be swirled by angling the metering slots at the ID of the disk rabbet. This will further increase the swirl factor in the web cavities. The increased swift factor will increase the heat transfer and thus reduce the rim metal temperature.

Returning to FIG. 5, rims 124A and 126A are shown to include a radially outer overlap. Specifically, the radially outer, rear face of the rim 124A is formed by a pair of offset radial surfaces 182 and 184 connected by an axial surface 186. The outermost edge of rim 124A is chamfered to reduce compressor path hot air from being ingested into the rotor cavity 168. At the same time, the radially outer rim 126A is defined by a complex configuration of surfaces which include a radial surface 188 extending from surface 180. The latter is parallel to and substantially adjacent surface 184. Another axial surface 190 is parallel to surface 188. These two radial surfaces 188 and 190 are connected by an axial surface 192 and a stepped edge 194 which forms an annular buffer cavity 196. There is a radial gap of 20–30 mil between axial surfaces 186 and 192, and a 50 mil axial gap between radial surfaces 182 and 190. The above described interface arrangement between the last two disks 124 and 126 will be duplicated at the interfaces of the remaining disks 128, 130 and 132 since they also need to be cooled, but to a lesser degree. This reduced cooling requirement is caused by the compressor air temperature dropping about 50° per stage from right to left in FIGS. 4 and 5. Small quantifies of cooling air will escape into the compressor flow path via the above described overlaps, e.g., about 0.22%Wc between each adjacent pair of disks, with sufficient pressure drop to prevent any gas ingestion.

The pressure drop through the disk slot bottom gap passages (i.e., passages 140, 142 and similar) is set by the compressor interstage static pressures. For example, at the last stage compressor rim 124A, the discharge static pressure is 326 psia and the cooling supply pressure feeding air to the blade dovetail slot bottom gap passages is slightly higher at 327 psia. The blade dovetail slot bottom exit pressure for the last stage compressor disk is 299 psia. This exit pressure is located at the midway point through the second to last stage stator vane 125 at the flow path hub. The pressure drop from 325 psia down to 299 psia is sufficient to produce a high enough slot velocity to create a heat transfer coefficient in the slot bottom gap passage that is comparable to the compressor flow path levels. Since there is a significant amount of cooling heat transfer surface area, it is fairly easy to cool the last stage disk rim 124A down to 825° F. where the CrMoV disk material can survive for more than the target 240,000 hours.

Specific pressures and flows at the 50 mil axial gaps between surfaces 188 and 192 of adjacent disk rims may vary depending on operating conditions. In the example given, cooling air escaping the gap between rims 124 and 126 may be about 0.22%Wc; and about 0.156%Wc between rims 126, 128. It should be appreciated, however, that the invention here is not limited to any specific temperature/pressure/flow values at any given points in the last five compressor stages. Such values may vary with specific applications, conditions, etc. The parameters of particular significance here are the last stage rim and compressor bore temperatures which, in accordance with this invention, are cooled to about 825° F. and 700° F., respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a gas turbine including a compressor having a bore and a rotor comprised of multiple stages extending between a first stage at a forward end of the compressor and a last stage at an aft end of the compressor, each stage including a rotor disk having a peripheral rim and multiple blades secured to the peripheral rim, a combustion system comprising a plurality of combustors utilizing discharge air from the compressor for combustion, and multiple turbine stages driven by combustion gases from the combustion system, the improvement comprising means for supplying cooling air at least to a peripheral rim of the last stage of the compressor, wherein said cooling air comprises compressor discharge air extracted from the combustion system downstream of the compressor and upstream of the plurality of combustors, and further including a heat exchanger arranged to cool said cooling air after extraction from the combustion system.

2. The improvement of claim 1 wherein said piping includes at least one insulated pipe extending through one or more radial struts which connect a casing of the combustion system to a stage one nozzle support structure.

3. The improvement of claim 1 wherein said means for dividing said cooling air includes an annular compressor discharge pressure seal which divides said annular compressor aft cavity into an upper cavity and a lower cavity, and wherein said cooling air is fed into said upper cavity.

4. The improvement of claim 1 and including means for dividing said cooling air into discrete cooling air components for
a) cooling said peripheral rim of the last stage of the compressor; and
b) cooling said bore.

5. The improvement of claim 4 wherein said cooling air is introduced into an annular compressor aft cavity located adjacent said last stage, and wherein said means for dividing said cooling air provides an additional discrete cooling air component for preventing hot compressor discharge air from entering said annular compressor aft cavity.

6. The improvement of claim 5 wherein said means for dividing said cooling air includes an annular compressor discharge pressure seal which divides said annular compressor aft cavity into an upper cavity and a lower cavity, and wherein said means for supplying cooling air feeds said cooling air into said upper cavity.

7. The improvement of claim 6 wherein said annular compressor discharge pressure seal includes a discourager seal potion which permits a predetermined quantity of cooling air to pass from said upper cavity to said lower cavity.

8. The improvement of claim 7 wherein said annular compressor aft cavity is defined in part by an annular cooling plate, and wherein said discrete cooling air component for cooling said peripheral rim of the last stage of the compressor flows through a plurality of axial passages in said annular cooling plate from said upper cavity.

9. The improvement of claim 8 wherein said cooling plate includes a radially outer tip including means for permitting said additional discrete cooling air component to flow from said upper cavity into the hot compressor discharge air and thereby prevent said hot air from entering said upper cavity.

10. The improvement of claim 8 wherein said cooling plate includes at least one radial passage extending between said lower cavity and said bore and wherein said discrete cooling air component for cooling said bore flows through said at least one radial passage.

11. The improvement of claim 10 wherein annular cooling cavities are provided between rim portions of adjacent ones of said rotor disks and wherein slots are provided in said rotor disks, permitting cooling air in said bore to flow into said annular cooling cavities between said adjacent ones of said rotor disks.

12. The improvement of claim 11 wherein each of said blades has a blade shank seated within a corresponding dovetail slot in a respective disk and wherein at least one axial cooling air slot is formed by a gap between a bottom surface of the blade shank and the dovetail slot, and further wherein cooling air flowing through said axial passages in said cooling plate enters an annular cavity formed between said cooling plate and said peripheral rim of said last stage, and then through said cooling air axial slots and into said annular cooling cavities between said adjacent ones of said rotor disks.

13. The improvement of claim 11 wherein the peripheral rims of at least the rotor disks of the last stage and a next-to-last stage are constructed with passageways to permit some of the cooling air in the respective annular cooling cavities to escape into said compressor discharge air.

14. The improvement of claim 13 wherein said passageways include a pair of radial portions separated by an axially oriented, annular buffer cavity.

15. The improvement of claim 11 wherein said slots in said rotor disks have angled surfaces at entrances to said annular cavities to facilitate swirling of said cooling air within said cavities.

16. The improvement of claim 5 wherein said annular compressor aft cavity is defined in part by an annular cooling plate, and wherein said discrete cooling air component for cooling said peripheral rim of the last stage of the compressor flows through a plurality of axial passages in said annular cooling plate from said upper cavity.

17. The improvement of claim 16 wherein said cooling plate includes at least one radial passage extending between said lower cavity and said bore and wherein said discrete cooling air component for cooling said bore flows through said at least one radial passage.

18. The improvement of claim 17 wherein annular cooling cavities are provided between rim portions of adjacent ones of said rotor disks and wherein slots are provided in said rotor disks, permitting cooling air in said bore to flow into said annular cooling cavities between said adjacent ones of said rotor disks.

19. The improvement of claim 18 wherein each of said blades has a blade shank seated within a corresponding dovetail slot in a respective disk and wherein at least one axial cooling air slot is formed by a gap between a bottom surface of the blade shank and the dovetail slot, and further wherein cooling air flowing through said axial passages in said cooling plate enters an annular cavity formed between said cooling plate and said peripheral rim of said last stage, and then through said cooling air axial slots and into said annular cooling cavities between said adjacent ones of said rotor disks.

20. The improvement of claim 18 wherein the peripheral rims of at least the rotor disks of the last stage and a next-to-last stage are constructed with passageways to permit some of the cooling air in the respective annular cooling cavities to escape into said compressor discharge air.

21. The improvement of claim 20 wherein said passageways include a pair of radial portions separated by an axially oriented, annular buffer cavity.

22. The improvement of claim 18 wherein said slots in said rotor disks have angled surfaces at entrances to said annular cavities to facilitate swirling of said cooling air within said cavities.

23. In a gas turbine comprising a compressor including a rotor and a plurality of bladed disks and associated rims extending from a forward end to an aft end of the compressor; a plurality of combustors, and a casing surrounding said combustors arranged to direct air from the compressor to the combustors; and a turbine including multiple stages driven by combustion gases from the plurality of combustors, and wherein cooling air is utilized to cool the compressor rotor, the improvement comprising:

at least one extraction port in said casing and associated piping for supplying compressor discharge air as cooling air to at least some of said plurality of bladed disks and associated rims at the aft end of the compressor.

24. The gas turbine of claim 23 wherein said associated piping communicates with passageways in said compressor for supplying said cooling air to said compressor rotor and to said at least some of said bladed disks and associated rims.

25. The gas turbine of claim 24 wherein a heat exchanger is located within said piping between said extraction port and said compressor rotor to cool said compressor discharge air before reaching said rotor.

26. The gas turbine of claim 25 and including a flow control valve between said heat exchanger and said rotor.

27. The gas turbine of claim 26 including a compressor part divided into an upper part and a lower part by an annular compressor discharge seal, and wherein said seal incorporates a discourager segment which allows some of said cooling air to flow into said lower part.

28. The gas turbine of claim 27 wherein said compressor cavity is defined in part by an annular cooling plate, and wherein a part of said cooling air for cooling a last of the associated rims in the aft end of the compressor flows through a plurality of axial passages in said annular cooling plate from said upper part.

29. The gas turbine of claim 28 wherein said cooling plate includes at least one radial passage extending between said lower part and a compressor bore, and wherein another part of said cooling air for cooling said bore flows through said at least one radial passage.

30. The gas turbine of claim 29 wherein said cooling plate includes a radially outer tip including means for permitting a portion of said cooling air to flow from said upper part into the hot compressor discharge air and thereby prevent said hot air from entering said upper part.

31. The gas turbine of claim 27 and including temperature indicator means for monitoring air temperature in said upper part of said cavity.

32. In a land-based gas turbine comprising a compressor including a rotor and a plurality of bladed disks and associated rims extending from a forward end to an aft end of the compressor; a plurality of combustors surrounded by a casing arranged to receive combustion air from the compressor; and a turbine including multiple stages driven by combustion gases from the plurality of combustors and wherein cooling air is utilized to cool the compressor rotor, a method of maintaining at least the last of said disks and its associated rim at a predetermined temperature comprising the steps of:

a) extracting cooling air from said casing;

b) introducing said cooling air into said compressor in a direction counter to a flow direction of the combustion air; and c) cooling said last disk and its associated rim to a predetermined temperature.

33. The method of claim 32 wherein said predetermined temperature is about 825° F.

34. The method of claim 32 wherein each of said plurality of bladed disks includes a plurality of blades having corresponding blade shanks seated within dovetail slots provided in a corresponding one of said disks, and wherein at least a portion of said cooling air is flowed axially toward a forward end of said compressor by means of axial slots formed between bottom surfaces of said blade shanks and bottom surfaces of said dovetail slots.

35. The method of claim 32 wherein step c) includes flowing at least a portion of said cooling air radially into an annular cooling cavity located between rims of said last disk and a disk adjacent said last disk.

36. The method of claim 35 wherein at least a portion of said cooling air is permitted to escape into the combustion air by flowing radially between said last disk and an adjacent disk to thereby further cool the rim associated with said last disk.

37. The method of claim 36 wherein said portion of said cooling air permitted to escape radially between said last disk and an adjacent disk upstream of said last disk passes through a buffer cavity which prevents the combustion air from flowing radially inwardly into said annular cooling cavity.

* * * * *